Figure 1:
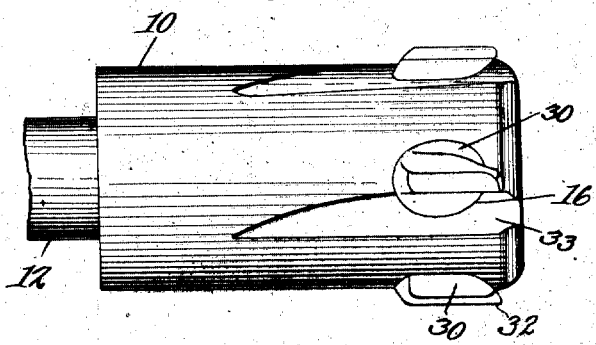

J. WITANOWSKI.
REAMER.
APPLICATION FILED SEPT. 21, 1916.

1,217,256.

Patented Feb. 27, 1917.

John Witanowski
Inventor

By
Attorneys

UNITED STATES PATENT OFFICE.

JOHN WITANOWSKI, OF CHICAGO, ILLINOIS.

REAMER.

1,217,256.  Specification of Letters Patent.  Patented Feb. 27, 1917.

Application filed September 21, 1916. Serial No. 121,413.

*To all whom it may concern:*

Be it known that I, JOHN WITANOWSKI, a citizen of the United States, residing at Chicago, in the county of Cook and State of Illinois, have invented new and useful Improvements in Reamers, of which the following is a specification.

This invention relates to reamers having adjustable cutters to vary the size of the cut, adjustment being effected by a traveling nut having a cone-shaped end engaging the inner ends of the cutters, the latter being advanced when the nut is advanced.

The invention has for its object to provide a novel and improved adjusting means of the kind stated, whereby any desired adjustment may be readily and accurately effected.

With the object stated in view, the invention consists in a novel combination and arrangement of parts to be hereinafter described and claimed, reference being had to the accompanying drawing forming a part of this specification.

Figure 2:
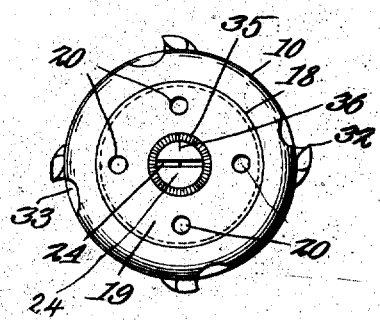
Figure 3:
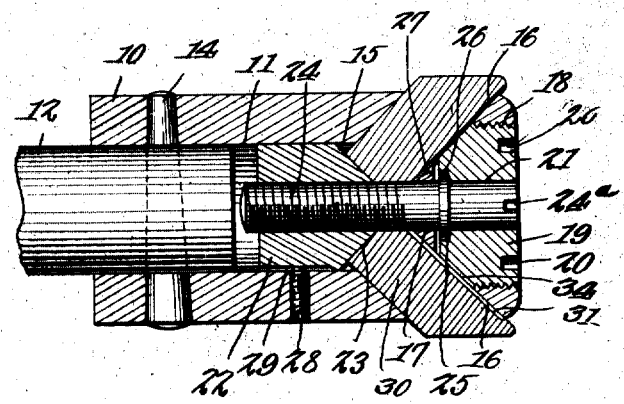
Figure 4:
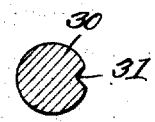
Figure 5:
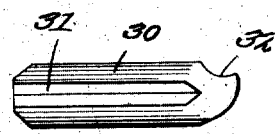

In the drawing,

Figure 1 is a side elevation of the tool;
Fig. 2 is an end view thereof;
Fig. 3 is a central longitudinal section;
Fig. 4 is a cross-section of one of the cutters, and
Fig. 5 is a side elevation thereof.

Referring specifically to the drawing, 10 denotes the stock of the tool, the same being cylindrical and having at its inner end a socket 11 for connection to the support or tool spindle 12, the stock being locked on the spindle by a cross pin or key 14 projecting at its ends from the side of the spindle and seating in side apertures in the socketed end of the stock.

The stock also has an axial bore 15 extending forward from the socket 11, and from this bore recesses 16 extend forward and sidewise to open through the side of the stock adjacent to its forward end. The cutters, to be presently described, seat in these recesses, any desired number thereof being provided, the drawing showing four. At the junction of the recesses 16 with the bore 15, the latter is continued for a short distance, as shown at 17, to a circular recess 18 in the outer end of the stock. The recess 18 extends back as far as the recesses 16 and opens thereinto, and it is threaded to receive a screw plug 19 having diametrically opposite apertures 20 in its outer face for the application of a suitable tool for turning the same. The plug also has a longitudinal central opening 21.

In the bore 15 is slidably mounted a cylindrical nut 22 having its end which faces the inner ends of the recesses 16, made conical, as shown at 23. The nut is tapped to receive the threaded end of a non-traveling screw 24 mounted in the opening 21 of the plug 19 and also passing through the short bore 17, this part of the screw being devoid of threads. The outer end of the screw is flush with the outer face of the plug 19 and has a nick 24ª for the application of a screw-driver for turning the same. That portion of the screw which seats in the opening 21 has an annular flange or collar 25 which seats in a countersink or enlargement 26 of said opening and back of this countersink the flange abuts against a shoulder 27 formed by junction of the bore 17 and the recess 18, whereby the screw is held against travel in the direction of its length, but is left free to turn.

The turning of the screw 24 will operate to move the nut 22 longitudinally, or axially with respect to the stock 10, the nut being prevented from turning in the bore 15 by a screw 28 threaded sidewise through the stock and having its inner end reduced and seating in a longitudinal groove 29 in the side of the nut.

In each recess 16 is slidably mounted a cutter having its body or shank 30 cylindrical to conform to the cross-section of the recess, and provided with an external longitudinal groove 31 which is V-shaped in cross section. The inner end of the cutter shank is beveled to fit the conical end 23 of the nut 22. The outer end of the cutter shank has a hollow-ground cutting portion 32, and where it protrudes from the stock 10, the surface of the latter is sunken, as shown at 33 to conform to the hollow of the cutting portion and to promote curling of the shavings.

It will be seen from the foregoing, that when the screw 24 is turned to advance the nut 22, the cutters 30 are pushed outward to project the desired distance from the side of the stock 10, and motion of the nut in the opposite direction allows the cutter to be pushed inward.

The inner end of the plug 19 is conical, as shown at 34, and as the inner end of the recess 18 opens into the recesses 16, the plug may be screwed inward to have its conical end impinge against the sides of the cutters 30. The cutters will be so positioned that their grooves 31 face the inner end of the plug. Hence, when the plug is screwed inward, its conical surface spans the grooves and locks the cutters against turning and longitudinal movement in the recesses 16 after the adjustment has been made. The conical surface bears firmly on the edges of the groove and thus insures rigidity of the cutters.

The outer face of the plug 19 has a circular series of graduations 35 coöperating with an index mark 36 on the outer end of the screw 24 for accurately gaging the hereinbefore described adjustment of the cutters.

I claim:—

A reamer comprising a stock having an axial bore, and recesses extending forwardly and sidewise therefrom through the side of the stock, a nut slidably and non-rotatably mounted in said bore and having a conical end, a non-traveling screw extending axially into the stock from the outer end thereof and threaded into the nut, cutters slidably and non-rotatably mounted in the aforesaid recesses and abutting at their inner ends against the conical end of the nut, and a plug threaded into the outer end of the stock and having a conical rear end engaging the cutters on the side to lock the same in the recesses, the sides of the cutters having longitudinal grooves which are spanned by the conical surface of the plug.

In testimony whereof I affix my signature.

JOHN WITANOWSKI.